United States Patent [19]

Iwami et al.

[11] Patent Number: 5,468,141
[45] Date of Patent: Nov. 21, 1995

[54] MOLD FOR INJECTION MOLDING OF THERMOPLASTIC RESIN

[75] Inventors: Hiroyuki Iwami, Osaka; Masayoshi Fukuoka, Yawata; Hiroyuki Kanayama, Osakasayama, all of Japan

[73] Assignee: Taiyo Manufacturing Works Co., Ltd., Osaka, Japan

[21] Appl. No.: 182,494

[22] Filed: Jan. 18, 1994

[30] Foreign Application Priority Data

Jan. 22, 1993 [JP] Japan .................................. 5-009527

[51] Int. Cl.⁶ .................................................. B29C 45/03
[52] U.S. Cl. ........................ 425/542; 249/114.1; 249/115
[58] Field of Search .................................. 249/112, 114.1, 249/115; 425/542

[56] References Cited

U.S. PATENT DOCUMENTS

| | | |
|---|---|---|
| 3,734,449 | 5/1973 | Itou et al. |
| 4,225,109 | 9/1980 | Yotsutsuji et al. |

FOREIGN PATENT DOCUMENTS

| | | |
|---|---|---|
| 0437345A2 | 7/1991 | European Pat. Off. |
| 0489335A1 | 6/1992 | European Pat. Off. |
| 1506209 | 12/1967 | France . |
| 2111377 | 6/1972 | France . |
| 533003 | 3/1973 | Switzerland . |
| WO89/10829 | 11/1989 | WIPO . |

OTHER PUBLICATIONS

Patent Abstracts of Japan, vol. 4, No. 96, Abstract (M-20) [578] (Jul. 11, 1980); JP-A-55-55839 to Toyoda Chuo Kenkyusho K.K.

Patent Abstracts of Japan, vol. 10, No. 249, Abstract (M-511) [2305] (Aug. 27, 1986); JP-A-61-79611 to Cuyemura & Co., Ltd.

*Primary Examiner*—Tim Heitbrink
*Attorney, Agent, or Firm*—Spencer, Frank & Schneider

[57] ABSTRACT

A mold for injection molding of a thermoplastic resin. The mold comprises a cavity block, a core block, and a cavity formed between the cavity block and the core block and adapted to be filled with a molten resin. The cavity block includes an insulating layer on a cavity side thereof, the insulating layer being made of a material selected from the group consisting of ceramic materials, porcelain enamel, glass materials, heat resistant plastic materials and their composites. The core block includes a release insulating layer on a cavity side thereof, the release insulating layer being made of a material selected from the group consisting of fluorocarbon resins, fluorocarbon resin composite materials, silicone resin composite materials and metal platings with fluorocarbon resin dispersion, the release insulating layer further being adapted to effect both mold releasing and heat insulation.

13 Claims, 4 Drawing Sheets

MOLD FOR INJECTION MOLDING OF THERMOPLASTIC RESIN

BACKGROUND OF THE INVENTION

1. Field of the Invention

The present invention relates to a mold for injection molding of a thermoplastic resin, particularly to a mold used for fabricating thermoplastic resin articles, which makes possible the accurate transfer of the gloss or fineness of the cavity surface to the articles without any sink marks thereon even at a low pressure.

2. Description of the Related Art

The known molds used for fabricating thermoplastic resin articles are made of metals such as conventional steel, nickel, nickel alloys, aluminum, aluminum alloys, copper, copper alloys, etc. A molten resin is introduced into a cavity under pressure to be molded to a predetermined shape and size. In this molding technique, generally a more precise article with good appearance can be obtained compared with other molding techniques such as blow molding, etc.

However, in the case where the article is fabricated by injection molding, using such a conventional mold, the pattern on the cavity surface is difficult to transfer to the article without blurring or losing its original fineness and gloss. If such blurring occurs in the pattern transferred to the article, the appearance of the article is spoiled, and its commercial value is lost. In addition, weld lines and flow marks are likely to remain on the surface of the article, as well as sink marks are likely to remain near an end part or on thick wall portions of the article.

In order to solve the above-mentioned problems, generally, the temperature of the mold or the injection pressure is increased. However, there is a limit to the improvement of the transfer accuracy even though the temperature of the mold is increased. In addition, the increase in temperature of the mold leads to a prolonged cycle time of molding. Thus, satisfactory results cannot be obtained. As for the increase in injection pressure, there is also a limit to the improvement of the transfer accuracy. The increase in injection pressure causes warpage due to residual strain, and causes much flashing, etc., resulting in degraded quality of articles. Moreover, the increase in injection pressure needs the enlargement of a molding machine, and the strengthening of the mold. Accordingly, this makes it difficult to economically fabricate satisfactory articles.

The reasons for the limit to the quality improvement of the article using a conventional mold are as follows:

The mold for injection molding is made of metals which generally have good thermal conductivity. When a molten resin is introduced and comes into contact with the cavity surface, the molten resin gives off heat to the cavity surface with rapid cooling; consequently a solid layer is immediately formed on the surface of the molten resin. More precisely, during the stage of mold filling, or flowing of the resin into the cavity, the internal pressure of the molten resin is relatively low, and the rapid solidification takes place on the very surface of molten resin prior to the completion of filling. These prevent the molten resin from coming into full contact with every intricate part of the pattern on the cavity surface. That is, the mold surface pattern cannot be transferred to the articles without losing its original fineness, thus resulting in poor appearance, even when a high pressure is given at the final stage of filling.

In recent years, there has been a demand to produce thin and large sized articles with good surface quality at a low cost.

In order to fabricate thin and large articles mentioned above, higher molding pressure has generally been used. The application of a higher pressure using a conventional mold, however, cannot meet this demand, because of giving articles unimproved appearance and secondary problems such as warpage and much flashing. In other words, there is a limit to produce the than and large articles with good appearance by increasing the pressure.

Much effort has been made, therefore, to develop new molding technology for obtaining good articles at a relatively low pressure. There are a number of known studies and technologies related to this subject as follows:

1) Low expansion injection molding for preventing sink mark.

2) Hettinger process: low pressure injection foaming technique.

3) SINPRES process: injection molding with gas introduction.

4) Injection compression molding.

5) Injection molding with an insulated mold.

6) Injection molding with a cavity surface treated mold: coating of an insulating and wettability-giving thin film onto a cavity surface.

In the above-mentioned processes 1) to 4), sink marks are substantially prevented from being formed. However, the unsatisfactory transfer of the pattern from the cavity surface to the article cannot be improved due to the fast solidification of the surface layer of the molten resin during filling, and phenomena of flow marks and weld lines also remain to be unimproved. Thus, articles with good surface quality cannot be obtained at a low molding pressure by these processes.

In the process 5), the solidification of the surface layer of the molten resin is delayed, and in the process 6), the adhesion between the injected molten resin and the cavity surface is improved due to the coating film therebetween. Thus, the transfer of the pattern from the cavity surface to articles is improved. However, under the condition of a low pressure, sink marks cannot be prevented from being formed near the end portions of the article against gate and/or on the thick wall portions of the articles, requiring high pressure molding for eliminating them.

As just described, articles with good quality cannot be fabricated at a low pressure even with the use of the above-mentioned processes.

SUMMARY OF THE INVENTION

The mold for injection molding of a thermoplastic resin of this invention, comprises: a cavity block, a core block, and a cavity formed between the cavity block and the core block, in which a molten resin is to be filled, wherein the cavity block has an insulating layer on its surface, and the core block has a release insulative layer, or release-functioned insulating layer on its surface with both functions of mold releasing and heat insulation.

In one embodiment of the present invention, the insulating layer is made of one selected from the group consisting of ceramic materials, porcelain enamel, glass materials, heat resistant plastic materials and their composite materials, and has a thermal conductivity preferably less than $8 \times 10^3$ cal/cm·sec·°C. and a thickness of 0.02 to 1 mm. Only for the mold for an optical article, as an exception, the thickness of the insulating layer preferably made of a ceramic material or a glass material is desirable in a range from 1 to 20 mm.

In another embodiment of the present invention, a than metal layer is further formed on the surface of the insulating layer.

In another embodiment of the present invention, the insulating layer is made of a heat-resistant plastic material or a plastic composite material with a thickness of 0.3 to 3 mm and has a metal layer with a thickness of 0.001 to 0.5 mm on its surface.

In another embodiment of the present invention, a than surface coating with good wettability to the molten resin is further formed on the metal layer.

In another embodiment of the present invention, the thin surface coating is made of one selected from the group consisting of a metal oxide, a silicon oxide, a silicon complex oxide, and a plastic material.

In another embodiment of the present invention, the silicon complex oxide is one selected from the group consisting of glass materials and porcelain enamel.

In another embodiment of the present invention, the thin surface coating has wattability with a contact angle of not more than 30° against water.

In another embodiment of the present invention, the release-functioned insulating layer is made of one selected from the group consisting of fluorocarbon resins, fluorocarbon resin composite materials, silicone resin composite materials, and metal platings with fluorocarbon resin dispersion.

In another embodiment of the present invention, the release-functioned insulating layer has a thermal conductivity of not more than $8\times10^{-3}$ cal/cm·sec·° C.

In another embodiment of the present invention, the release-functioned insulating layer has a thermal conductivity of not more than $8\times10^{-3}$ cal/cm·sec·° C. and a wettability developing temperature of 90° C. or more under the conditions shown in Table 1.

Thus, the invention described herein gives a mold the advantage, which makes possible the accurate transfer of the gloss or fineness of the cavity surface to articles without any sink marks thereon at a low pressure such as two-third or less, in some cases, about one-fifth of that in using the conventional mold.

This and other advantages of the present invention will become apparent to those skilled in the art upon reading and understanding the following detailed description with reference to the accompanying figures.

DESCRIPTION OF PREFERRED EMBODIMENTS

The inventors of the present invention studied the wettability between the cavity surface and the molten resin, for resolving the above-mentioned problems. The result of the study will be outlined below.

Each block (4 cm×4 cm×1 cm) used for a cavity which was composed of the various materials listed in Table 1 was placed on a temperature-controlled heating platen. Then, a molten resin (ABS resin, 230° C., 8 g) was pressed against the surface of the block. By repeating this operation with varying the controlled temperature, the temperature of the block surface was measured, at which temperature the molten resin began to adhere to the block due to the wettability developed therebetween (hereinafter, referred to as wettability-developing temperature). In addition, the time required for releasing the molten resin from the block surface (contact time) was measured, in which the temperature of the block surface was set to be 2° C. higher than the wettability-developing temperature.

The composition of a block used for a wettability test is shown in Table 1, together with part of data obtained.

TABLE 1

| | The composition of a block used for a wettability test and representative data | | |
| --- | --- | --- | --- |
| No. | Materials for mold and their composition | Wettability-developing temperature (°C.) | Contact time (sec.) at wettability-developing temperature plus 2° C. |
| 1. | Steel | 112 | 120 |
| 2. | Zirconia (ceramic) | 85 | — |
| 3. | Glass | 79 | 44 |
| 4. | Epoxy resin | 21 | 120 |
| 5. | Steel coated with a 0.5 mm epoxy resin layer | 51 | 3 |
| 6. | Steel coated with a 1.0 mm epoxy resin layer | 27 | 5 |
| 7. | Steel coated with a 0.5 mm epoxy resin layer, on which a 0.1 mm nickel layer is further formed | 65 | 5 |
| 8. | Steel coated with a 0.5 mm epoxy resin layer, on which a 0.2 mm nickel layer is further formed | 71 | 6 |
| 9. | Steel coated with a 10 mm epoxy resin layer, on which a 0.4 mm nickel layer is further formed | 95 | — |
| 10. | Steel coated with a 1.0 mm epoxy resin layer, | 64 | 8 |

TABLE 1-continued

The composition of a block used for a wettability test and representative data

| No. | Materials for mold and their composition | Wettability-developing temperature (°C.) | Contact time (sec.) at wettability-developing temperature plus 2° C. |
|---|---|---|---|
|  | on which a 0.2 mm nickel layer is further formed |  |  |
| 11. | Steel coated with a 0.5 mm epoxy resin layer, on which a 0.1 mm nickel layer and a 0.3 μm thin film of $SO_2$ are formed | 59 | 2 |
| 12. | Steel coated with a 0.5 mm epoxy resin layer, on which a 0.1 mm nickel layer and 3 μm thin film of polyimide are formed | 56 | 2 |
| 13. | Steel coated with a 0.03 mm fluorocarbon resin layer | 120 | — |

From the above experimental data, the following can be understood.

Metal materials have satisfactory thermal conductivity, such as $1.99 \times 10^{-1}$ cal/cm·sec·° C. for steel. When a molten resin at a high temperature comes into contact with steel, the molten resin is immediately cooled and forms a solidified layer on the surface. Therefore, the wettability dose not develop between the steel and the molten resin. For the wettability development, the temperature of the steel surface needs to be raised to 112° C. or more.

Ceramic materials such as zirconia, resin materials such as an epoxy resin, glass, and the like, have much lower thermal conductivity, compared with the metals (i.e., thermal conductivity of zirconia: $4 \times 10^{-3}$ to $7 \times 10^{-3}$ cal/cm·sec·° C., and that of an epoxy resin: $5 \times 10^{-4}$ cal/cm·sec·° C.). When a molten resin comes into contact with a block made of either of those materials, even though the block itself has a low temperature, the block surface is rapidly increased in temperature and is able to adhere to the molten resin. In the case of using an epoxy resin, for example, it can adhere even at a room temperature of 21° C.

However, the molten resin is not satisfactorily released from the surface of these blocks due to having low thermal conductivity. More specifically, although the wettability can develop on the surface of these blocks at a low temperature, it takes a long time for these blocks to give off heat and for the molded resin to be released from these blocks.

Making use of the difference in the thermal conductivity of metals and other materials, the insulation coating of a resin, a ceramic material or a glass material on a metal may be considered to regulate the surface properties such as wettability and a heat discharge rate. By applying such coating, even though the temperature of the block is low, the surface thereof and the molten resin can adhere to each other. In addition, the contact time can be controlled by varying the thickness of the insulation coating.

This composition of the block, just mentioned above, cannot directly applied to most of practical molds. The reason is as follows: In the case where only the insulating layer is formed on the block, surface patterns tend to be deformed during molding because of the softness of the insulating layer. For preventing deformation, therefore, it is necessary to further-form a thin metal layer with providing fine or intricate patterns such as a hair line, a satin finish, etc., on the insulating layer.

Moreover, if a thin surface coating, made of an inorganic substance such as silicon dioxide or an organic substance such as polyimide is applied on the metal layer for improving surface property, the wettability will develop at a lower surface temperature. More specifically, in the case where the surface portion was composed of the above-mentioned thin film coated metal layer having a thickness of 0.1 mm, and the insulating layer having a thickness of 0.5 mm, the wettability could develop on the surface coating at a temperature of 59° C. (i.e., 6° C. lower than the case where such a thin surface coating was not provided). This is understandable from the comparison between No. 7 and No. 11 in Table 1. It is also understandable that the improvement of wettability is effective to up-grading the product quality and/or to widening the ranges of optimum conditions, in molding not only conventional resins such as ABS, PE, PP, PS, PC, etc.; but also engineering plastics such as PC, PA, PBT, modified PPE, PPS, PES, liquid crystal resins, etc. as well as reinforced resins filled with fibrous or inorganic fillers, etc.

Based on the above-mentioned findings, a mold for fabricating a flat article (5 cm×5 cm×0.2 cm) was prepared and a molding experiment was conducted using this mold.

First, the surface of a mother mold made of brass (5 cm×5 cm×3 cm) was mirror-polished, and the surface of the mother mold was release-treated with a bichromate solution. Then, nickel was plated with a sulfamate solution to a thickness of 0.1 mm onto the surface of the mother mold. Further, a heat-resistant insulating layer (1 mm) with high stiffness made of an epoxy resin composite material and backing steel (5 cm×5 cm×1 cm) was applied to the rear surface of the plated nickel in this order. Thereafter, the mother mold was removed from the laminated block mentioned above to obtain a cavity block. A core block, on the other hand, was made of conventional steel. The cavity block and the core block were combined to construct a mold for injection molding.

An ABS resin was injection molded using the mold thus obtained. Under the limited conditions of a mold temperature of 80° C. to 85° C., a very low intra-cavity pressure of 100 kg/cm$^2$, and the highest injection speed, a glossy article without any sink marks on its front surface which faced the cavity block during molding and with plenty of sink marks only on the rear surface which faced the core block was obtained. On the other hand, under the conditions other than these limited ones, sink marks were formed even on a part of or throughout the front surface.

In order to obtain articles with satisfactory appearance under broader molding conditions, the inventors further studied a more suitable core block in detail. As a result, by forming a layer having both insulation and satisfactory release property (a release-functioned insulating layer), for example 0.05 mm of a fluorocarbon resin coating on the surface of the core block, the pattern on the cavity surface is accurately transferred to the articles, under the broader conditions of a mold temperature of 62° C. or more, an intra-cavity pressure of 100 kg/cm$^2$ or more, and from low to high injection speed. The article thus obtained had more sink marks on the rear surface, which led to no warpage due to the elimination of internal stresses in a low range of injection pressure.

The purpose of providing the release-functioned insulating layer on the surface of the core block is as follows:

In the case where the release-functioned insulating layer is provided on the surface of the core block, the molten rein injected into the cavity is immediately cooled to shrink, and can be quickly released from the core surface under the condition that a portion of the molten resin facing the core surface keeps a high temperature. When the release proceeds, the air layer develops between the molten resin and the core surface, and then the air layer provides the remarkable insulating effect, delaying the cooling and helping the free shrinkage by molecular relaxation of the molten resin facing the core surface. Thus, the faster cooling without any shrinkage of the portion facing the cavity surface can be easily attained. Accordingly, the articles without any sink marks, on which the pattern of the cavity surface is accurately transferred, are obtained.

Examples of a method for forming a release-functioned insulating layer on the core surface include a fluorocarbon resin coating method, a fluorocarbon resin composite coating method, a silicone resin composite coating method, a fluorocarbon resin-dispersed nickel plating, or the like. Examples of the fluorocarbon resin include polytetrafluoroethylene, tetra-fluoroethylene-hexafluoropropylene copolymer, polyvinylidenefluoride, polychlorotrifluoroethylene, tetrafluo-roethylene-ethylene copolymer, perfluoroalkylvinylether copolymer, etc. Examples of the fluorocarbon composite resin include mixtures of the fluorocarbon resin and other resins. Examples of the silicone type composite resins include silicone resin, mixtures of silicone resin and other resins.

Stainless steel, a titanium-based alloy, and the like, having Insulation much better than that of conventional steel, are desirable as a backing material for the core block of a mold.

Various resins for molding other than an ABS resin were molded in a mold ( cavity size: 5 cm×5 cm×0.2 cm) consisting of a cavity block (thickness of an insulating layer: 1 mm, thickness of a metal layer: 0.1 mm) and a core block (thickness of a release-functioned insulating layer: 0.05 mm). This experiment revealed that satisfactory results similar to those of the ABS resin could be obtained in the case of using conventional resins such as PE, PS, PP, PC, etc.

However, in the case of molding materials having high heat distortion temperature (HDT) such as PC reinforced with 30% glass fiber (HDT 148° C. at 18.5 kgf/cm$^2$ load) and PBT with 30% glass fiber (HDT 210° C. at 18.5 kgf/cm$^2$ load), sink marks were likely to be formed on a portion of the obtained article facing the cavity block at a low injection pressure.

The reason for this unfavorable phenomenon is considered as follows:

The resins with a glass fiber, having a high HDT, begin to solidify at much higher temperature, and their shrinkage during solidification is much smaller, compared with that of unfilled resins. (Reference: The mold shrinkage of unfilled PC is 0.5 to 0.7%, and that of PC with 30% glass fiber is 0.1 to 0.2% (from Modern Plastics Encyclopedia '91 Characteristic Table ).)

With a reinforced resin, there becomes short the contact time in an adhered state between the cavity surface and the molten resin, while on the core surface, the heat insulating effect of the air layer caused by the rapid release of the resin cannot be expected, thus resulting in rapid solidification of the resin. As a result, the shrinkage of a portion of the molten resin facing the core surface is not sufficiently proceeded. This leads to the formation of sink marks on the front surface of the obtained article facing the cavity block.

In order to delay the cooling rate on the core surface, the release-functioned insulating layer of the core block should be made sufficiently thick, compared with the insulating layer on the cavity block; for example, the thickness of the insulating layer on the cavity block is set at 0.5 mm and that of the release-functioned insulating layer on the core block is set at 5 mm. In such an example, the pattern on the cavity surface is desirably transferred to the articles with sink marks only on the rear surface facing the core block.

Further, it is understood that the wettability between the molten resin and the cavity surface is improved and its developing temperature is decreased by 5° to 10° C., by applying a thin surface coating with satisfactory wettability (e.g., SiO$_2$ coating) on the metal layer of the cavity block. Thus, the satisfactory transfer of the pattern from the cavity surface to the articles can be conducted under broad conditions.

Preferred examples of the thin surface coating include metal oxides such as titanium oxide (TiO$_2$), chromium oxide (Cr$_2$O$_3$), and zirconium oxide (ZrO$_2$); silicon oxides such as silicon dioxide (SiO$_2$); and silicon complex oxides such as glass, porcelain enamel, etc. The contact angles of the respective cavity block with such thin surface coatings against water is measured to be 30° (TiO$_2$), 13° (Cr$_2$O$_3$), 27° (ZrO$_2$), 10° (SiO$_2$), 12° (glass), and so on. Plastics, excellent in affinity with a molten resin, may also be used as the thin surface coating. In particular, a plastic thin film formed by plasma polymerization, electro-deposition, a dipping process, spray coating, electrostatic coating, etc. is preferred.

According to the present invention, the above-mentioned cavity block and core block are combined to make a mold. When articles are fabricated using such a mold, the pattern on the cavity surface is accurately transferred to the articles at a lower pressure (i. e., two-third or less of) than that in using a conventional mold. Also, the articles have excellent appearance without any sink marks, flow marks, jetting, etc. The present invention makes it possible to fabricate such articles under the usual scope of molding conditions with a standard machine.

The mold for injection molding according to the present invention includes a cavity block and a core block. A molten resin is filled into a cavity surrounded by the surface of the cavity and core blocks. On the cavity surface an insulating layer is applied for developing "wettability" against the injected resin and for controlling the heat discharge rate of it. The core surface has a release-functioned insulating layer thereon. With this combined mold structure, the objective of the present invention can be achieved.

It is preferred that the thermal conductivity of the insulating layer provided on the cavity surface is as low as possible. The thermal conductivity is preferably $8\times10^{-3}$ cal/cm·sec·° C. or less, more preferably $5\times10^{-3}$ cal/cm·sec·° C. or less.

In the case where the insulating layer is made of a heat-resistant plastic material or a ceramic material, etc., the thickness thereof is preferably 0.02 to 1 mm. In the case of forming a thin metal layer on the insulating layer, the preferable thickness of which is 0.3 to 3 mm, more preferably 0.5 to 1.5 mm. If the thickness is less than 0.3 mm, weld lines, flow marks, etc. are still likely to be formed. If the thickness is more than 3 mm, a molding cycle is largely prolonged, resulting in unsatisfactory productivity. The thickness of the metal layer mentioned above is in the range of 0.001 to 0.5 mm, more preferably 0.01 to 0.2 mm.

Examples of the heat-resistant plastic materials include an epoxy resin, polyimide, polybenzimidazole, polyimidazopyrrolone, polyetheretherketone, polyphenylenesulfide, etc.

Further, a thin surface coating having satisfactory wettability to the molten resin is preferably formed on the surface of the metal layer. Such a thin surface coating is preferably made of a metal oxide, a silicon oxide, a silicon complex oxide (e.g., glass, porcelain enamel, etc.), or a plastic material. Although the thickness of the thin surface coating varies depending upon a material thereof or a preparation method thereof, it may be 5 mm or less.

The release-functioned insulating layer on the core surface is preferably made of one selected from the group consisting of fluorocarbon resin (e.g., polytetrafluoroethylene), a fluorocarbon resin composite material, a silicone resin composite material, and a fluorocarbon resin-dispersed nickel, etc. In the case where a thick release-functioned insulating layer is required, a thin and only release-functioned surface coating may be applied on a thick insulating layer. Beside the method just mentioned above, by forming a thin metal layer on the thick insulating layer for the core block, it is also possible to give the core surface an effective release function due to raising a release temperature, i.e., a wettability temperature, shown in Table 1 No. 9. The thickness of the release-functioned insulating layer is preferably 0.01 to 7 mm. In the case where a conventional resin is molded, the thickness of the release-functioned insulating layer may be 0.01 to 0.3 mm; while for an engineering resin the thickness of that layer should be increased up to 7 mm, depending on HDT of the resin used. In the case where the thickness of the release-functioned insulating layer is less than 0.01 mm, satisfactory insulation is not attained. In the case where the thickness of the insulating layer is more than 7 mm, the difference in cooling rate between the cavity and core surfaces becomes larger, which generates warpage in obtained articles, in some cases.

In a special mold for an article for optical application and the like, very thick ceramics and glass are used as a material for the insulating layer: zirconia as a representative of the former has a linear expansion coefficient of $8 \times 10^{-6}/°$ C. to $11 \times 10^{-6}/°$ C. and a thermal conductivity of $4 \times 10^{-3}$ cal/cm·sec·° C. to $7 \times 10^{-3}$ cal/cm·sec·° C.; the latter such as a soda-lime glass sheet has a linear expansion of $8 \times 10^{-6}/°$ C. to $9 \times 10^{-6}/°$ C. and a thermal conductivity of $1.8 \times 10^{-3}$ cal/cm·sec·° C. It is preferred that the thickness of the insulating layer is set to be larger (i.e., 1 mm to 20 mm) so that the injected resin can gradually be cooled in the case of requiring lesser internal stress in the articles.

Hereinafter, the mold for injection molding of a thermoplastic resin according to the present invention will be described in detail with reference to the drawings.

Figure 1:
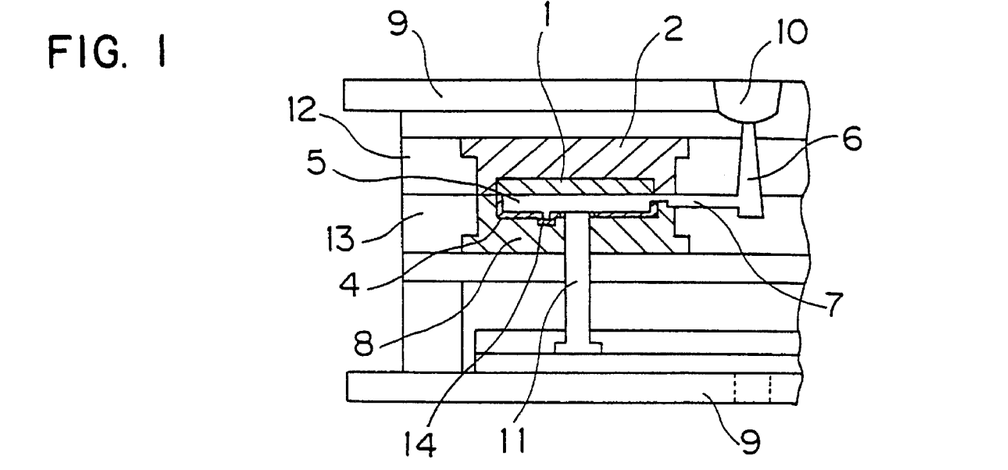
FIG. 1 is a cross-sectional view schematically showing an example of a mold for injection molding according to the present invention.

FIG. 1 is a cross-sectional view schematically showing an example of the mold for injection molding according to the present invention. The mold includes a cavity block 2 and a core block 8. The cavity block 2 has an insulating layer 1 made of a ceramic material (having good heat insulation) on its surface. The core block 8 has a release-functioned insulating layer 4 formed by fluorocarbon resin-dispersed nickel plating. The insulating layer 1 is soldered to the cavity block 2, thereby forming the cavity surface. A molten resin is introduced from an injection molding machine into a nozzle touching portion 10. The molten resin thus introduced passes through a sprue 6 and a runner and gate 7 to be filled in a cavity 5, which is formed between the cavity block 2 and the core block 8.

Figure 2:
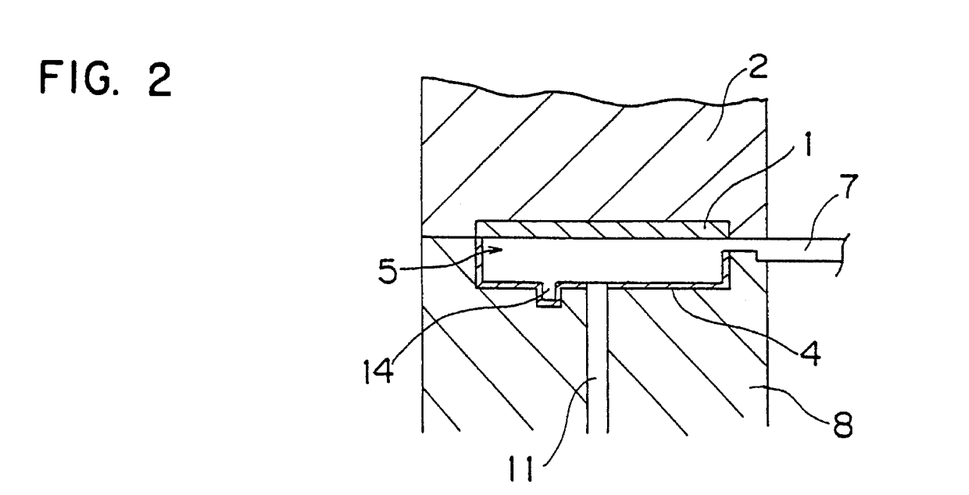
FIG. 2 is an enlarged view of a main portion of the mold shown in FIG. 1.

FIG. 2 is a cross-sectional view schematically showing an example of the mold for optical articles. In the case of fabricating optical articles, the requirement for the accurate surface transfer of the cavity block 2 to articles is severe. Therefore, it is preferred that the thickness of the insulating layer 1 is set to be 5 mm or more so that the filled resin can gradually be cooled and the contact time between the filled molten resin and the cavity block 2 is made longer, even if the molding cycle is sacrificed.

The reference numerals 9, 11, 12, 13, and 14 denote a clamping plate, an ejector pin, a cavity plate, a core plate, and a rib groove, respectively.

Figure 3:
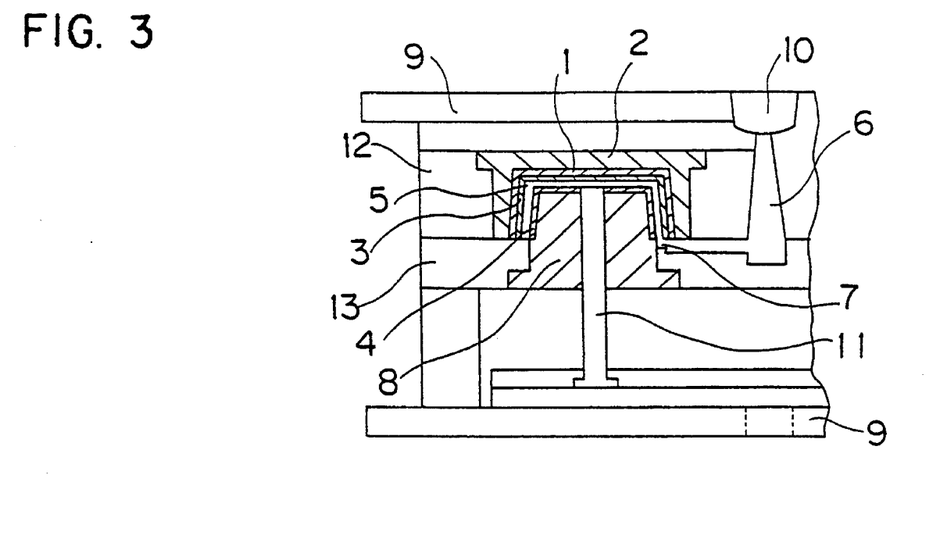
FIG. 3 is a cross-sectional view schematically showing another example of a mold for injection molding according to the present invention.
Figure 4:
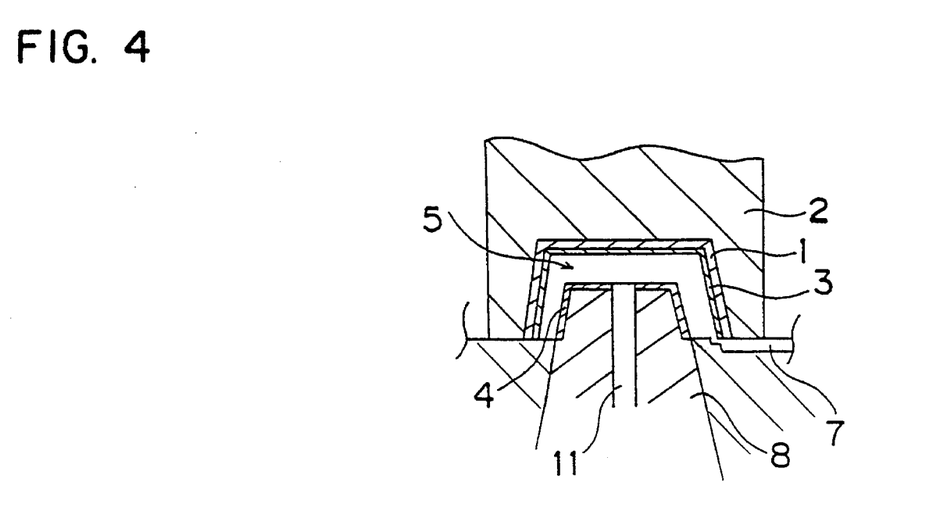
FIG. 4 is an enlarged view of a main portion of the mold shown in FIG. 3.

FIG. 3 is a cross-sectional view schematically showing another example of the mold for injection molding according to the present invention. In this figure, the identical components to those in FIG. 1 bear the identical reference numerals thereto. A thin metal layer 3 is formed on an insulating layer 1 on a cavity block 2 in a concave shape. The cavity block 2 is produced as follows: A mother mold having the same configuration as that of an article is formed. Then, the thin metal layer 3 made of nickel is electro-formed on the surface of the mother mold and is pressed into the cavity block 2 by insertion of a heat-resistant plastic material therebetween as an insulating layer 1. Thereafter, the mother mold is removed to obtain the cavity block 2. A release-functioned insulating layer 4 is formed on the surface of the core block 8 by fluorocarbon resin coating in the same way as described above.

The insulating layer and the release-functioned insulating layer may be provided on a part of the cavity block and a corresponding part of the core block, respectively.

In the mold for injection molding according to the present invention, when a molten resin is filled in the cavity, the cavity surface is rapidly increased in temperature to cause wettability. Thus, the molten resin tightly comes into contact in an adhered state with the cavity surface, and is cooled to be solidified while the pattern on the cavity surface is accurately and uniformly transferred to the molten resin. Consequently, articles obtained have no flow marks, weld lines, jetting, etc.

Since the release-functioned insulating layer is formed on the core surface, the cooling of the surface of the molten resin can be delayed. More specifically, although the molten resin is in contact with the surface of the release-functioned insulating layer, the molten resin is in a condition of being easily released even at a high temperature from the surface of the release-functioned insulating layer. For this reason, the filled molten resin is rapidly released from the surface of this layer due to the immediately started cooling and shrinkage of the filled molten resin. In the meantime, air comes in between the core surface and the filled molten resin to decelerate the cooling rate of the molten resin.

As mentioned above, while the molten resin continues to shrink only on the core surface, the fast solidifying resin remains in contact with the cavity surface. Thus, the shrinkage of the resin on the cavity surface is not proceeded. In the meantime, the wettability is lost between the cavity surface and the molten resin due to the decrease in temperature of the cavity surface. At this point, a sufficiently thick solidified layer is formed on the surface of the molten resin; therefore, any sink marks are not formed on the front surface of an article facing the cavity block. Thereafter, the cooling step proceeds, and the solidification of the article is completed.

Hereinafter, the present invention will be described by way of illustrative examples with reference to the drawings.

Example 1

Figure 5:
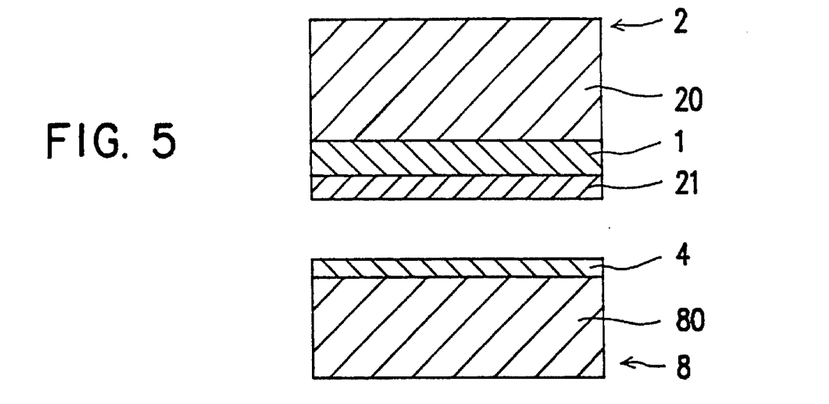
FIG. 5 is a cross-sectional view of a main portion of a mold for injection molding of one example according to the present invention.

An insulating layer with a thickness of 0.5 mm was formed on the surface of a glossy nickel plate with a size of 5 cm×5 cm×0.1 mm. The insulating layer (thermal conductivity: $3\times10^{-3}$ cal/cm·sec·°C.) was made of a heat-resistant epoxy resin filled with silica powders. Steel backing was attached to the insulating layer to compose a cavity block with a size of 5 cm×5 cm×1.5 cm as shown in FIG. 5. In FIG. 5, the reference numeral 2 denotes a cavity block, 20 a steel backing, 1 an insulating layer, and 21 a nickel plate.

Separately, a cavity with a size of 4 cm×4 cm×0.2 cm was engraved on the surface of steel with a size of 5 cm×5 cm×1.5 cm. Further, a tapered rib groove with a width of 3.5 mm, a length of 2 cm, and a depth of 0.5 cm was engraved on a bottom surface of the cavity to obtain a core block. In addition, the surface of the core block was plated with fluorocarbon resin-dispersed nickel (Trade name: Methafulon, manufactured by Uemura Industrial Co., Ltd.) to form a release-functioned insulating layer (thickness: 0.03 mm) as shown in FIG. 5. In FIG. 5, the reference numeral 8 denotes a core block, 4 a release-functioned insulating layer, and 80 a steel backing.

Next, a two-cavity mold with the same shaped and sized cavities was fabricated: one of the cavities consisted of a pair of the cavity and core blocks according to the present invention Just mentioned above, and another consisted of a pair of the conventional steel blocks. The surface of each cavity block was mirror-polished. A pressure sensor was attached to each core block so as to measure the intra-cavity pressure during injection.

The mold was provided in a conventional injection molding machine. Two articles from the corresponding cavities were molded at the same time, using ABS resin. The comparison of these articles revealed the following:

The article fabricated in the cavity according to the present invention had good and glossy appearance without any sink marks on its front surface which faced the cavity block during molding. Also, such an article could be fabricated under broad molding conditions of a mold temperature of 65° C. or more, an intra-cavity pressure of 100 kg/cm$^2$ or higher, and from low to high injection speed.

The comparative article fabricated in the cavity formed with conventional steel had some defects. That is, the article had sink marks on its entire front surface which faced the cavity block during molding at an intra-cavity pressure of 400 kg/cm$^2$ or less. In the case of an intra-cavity pressure of 500 kg/cm$^2$ or less, the article had remarkable sink marks on its front surface corresponding to the rib. Even in the case of an intra-cavity pressure of 600 kg/cm$^2$ or more, sink marks were still formed, and gloss of the front surface was inferior to that of the article obtained according to the present invention. Under the condition of a high-speed injection, Jetting was caused on a surface of the article near the gate of the mold.

Example 2

A mold of the present example was obtained in the same way as in Example 1, except that the thickness of the insulating layer and that of the nickel plate provided on the cavity block was 1.2 mm and 0.01 mm, respectively, and the thickness of the release-functioned insulating layer provided on the core block was 0.2 mm. Injection molding was conducted by using the mold in the same way as in Example 1 to obtain two kinds of articles. The comparison of these articles showed the following:

The article obtained in the present example had good and glossy appearance without any sink marks on its surface as in Example 1. The comparative article had some defects as shown in Example 1.

Example 3

A mold of the present example was obtained in the same way as in Example 1, except that a core pin with a diameter of 10 mm and a height of 2 cm was provided at the center of each core block so as to obtain an article with an opening at its center. Injection molding was conducted by using the mold in the same way as in Example 1 to fabricate two kinds of articles. The comparison of these articles showed the following:

The article obtained in the present example had good and glossy appearance without any weld lines and sink marks. The comparative article had a clear weld line on its surface corresponding to the opposite side of the opening against the gate. The other results were similar to those of Example 1.

Example 4

Figure 6:
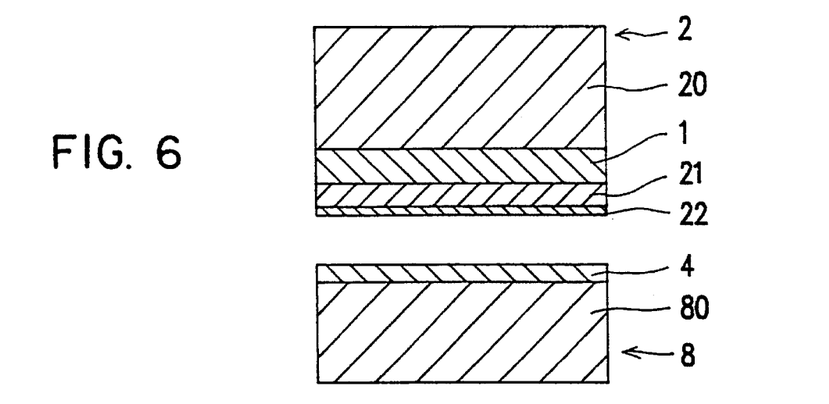
FIG. 6 is a cross-sectional view of a main portion of a mold for injection molding of another example according to the present invention.

A mold of the present example was obtained in the same way as in Example 1, except that a thin film of silicon dioxide having a thickness of 0.3 μm was formed as a wettability-developing layer (thin surface layer) by sputtering on the surface of the nickel plate on the cavity block as shown in FIG. 6. In FIG. 6, the reference numeral 2 denotes a cavity block, 20 a steel backing, 1 an insulating layer, 21 a nickel plate, 22 a wettability-developing layer, 8 a core block, 4 a release-functioned insulating layer, and 80 a steel backing. Injection molding was conducted by using the mold in the same way as in Example 1 to obtain two kinds of articles. The comparison of these articles showed the following:

A desired article similar to that of Example 1 was obtained in the cavity according to the present example at a mold temperature of 59° C. which was about 6° C. lower than that of Example 1. The comparative article had some defects as shown in Example 1.

Example 5

A mold was obtained in the same way as in Example 1, except that a polyimide thin film having a thickness of 3 μm was formed as a wettability-developing layer (thin surface layer) by electro-deposition on the surface of the nickel plate on the cavity block. Injection molding was conducted by using the mold in the same way as in Example 1 to obtain two kinds of articles. The comparison of these articles showed the following:

A desired article similar to that of Example 1 was obtained in the cavity according to the present example at a mold temperature of 56° C. which was about 3° C. lower than that of Example 4. The comparative article had some defects as shown in Example 1.

Example 6

Figure 7:
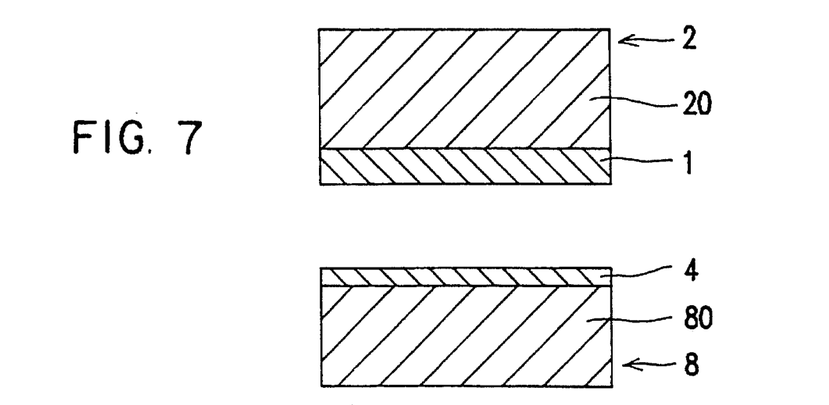
FIG. 7 is a cross-sectional view of a main portion of a mold for injection molding of another example according to the present invention.

A sheet of glass having a thickness of 5 mm was soldered to the surface of YAG (trade mark for steel by Hitachi Metals, Ltd.) to obtain a cavity block. The glass-lined cavity block thus obtained was ground to a size of 5 cm×5 cm×1.5 cm, and was subjected to lapping to obtain a mirror-polished surface. A core block made of a titanium alloy was engraved to form a cavity with a size of 4 cm×3 cm×0.3 cm. A fluorocarbon resin was coated to a thickness of 0.3 mm on the surface of the core block. Then, the cavity block and the core block thus obtained as shown in FIG. 7 were embedded in a set of steel mold base. In FIG. 7, the reference numeral 2 denotes a cavity block, 20 a steel backing, 1 an insulating layer, 8 a core block, 4 a release-functioned insulating layer, and 80 a steel backing. Further, the corresponding cavity and core blocks made of conventional steel were also embedded in the same set of mold base to complete a two-cavity mold, as explained in Example 1. Polycarbonate resin was injection molded in the mold at a mold temperature of 85° C. to obtain two kinds of articles. The comparison of these articles revealed the following:

In the article of the present example fabricated under the condition of an injection pressure (an intra-cavity pressure) of 500 kg/cm² and an injection time of 2 to 3 seconds, its front surface had good quality without any strain in reflected image. The molding cycle was 90 seconds or more.

The comparative article had much strain on its surface.

Example 7

A mold was obtained in the same way as in Example 1, except that the thickness of the insulating layer provided on the cavity block was 0.3 mm, and that of the release-functioned insulating layer provided on the core block was 5 mm. Polycarbonate resin filled with 30% glass fiber was injection molded to obtain two kinds of articles. The comparison of these articles revealed the following:

In the article of the present example under the condition of a mold temperature of 85° C., an intra-cavity pressure of 150 kg/cm², a high injection speed, and an injection and holding time of 6 seconds, glass fibers did perfectly not appear on the front surface of the article which faced the cavity block during molding. Also, the surface had good gloss, as a result of accurate transfer of the cavity surface. On the other hand, sink marks were recognized on the entire rear surface of the article which faced the core block during molding.

The comparative article had defects. That is, in the case of an intra-cavity pressure of 500 kg/cm² or less, sink marks were formed both on front and rear surfaces. In the case of an intra-cavity pressure of 600 kg/cm² or more, sink marks were not formed; however the front and rear surface did not have gloss due to appearing of glass fibers.

Example 8

Zirconium was coated onto the surface of a steel backing (5 cm×5 cm×1.5 cm) by flame spraying to form an insulating layer having a thickness of 0.3 mm. The surface of the insulating layer thus obtained was ground and further polished to obtain a cavity block 2 having a mirror surface as shown in FIG. 8.

Figure 8:
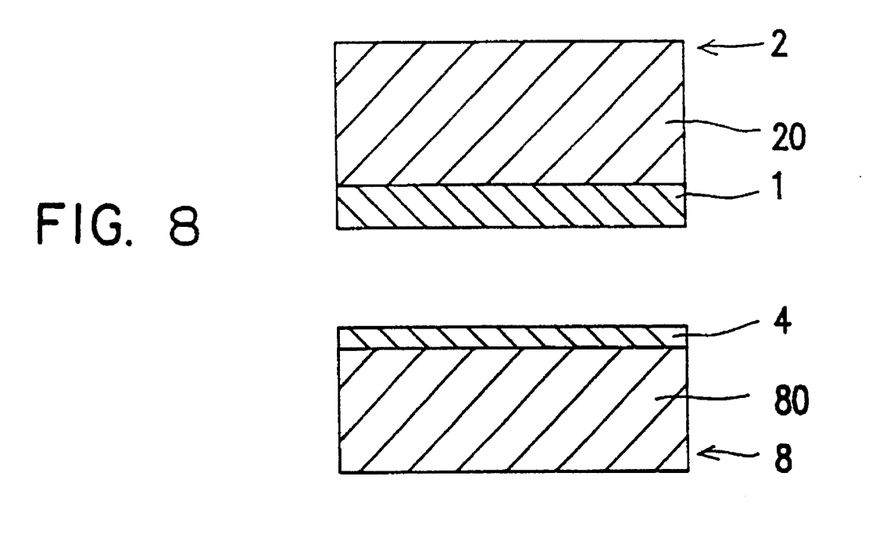
FIG. 8 is a cross-sectional view of a main portion of a mold for injection molding of another example according to the present invention.

A core block 8 as shown in FIG. 8 was obtained in the same way as in Example 1, except that fluorocarbon resin was coated to a thickness of 3 mm instead of fluorocarbon resin-dispersed nickel plating.

In FIG. 8, the reference numeral 2 denotes a cavity block, 20 a steel backing, 1 an insulating layer, 8 a core block, 80 a steel backing, and 4 a release-functioned insulating layer.

Then, a mold was fabricated in the same way as in Example 1, using the above-mentioned cavity block and core block. Articles of the present example and comparative example were obtained by injecting ABS resin under the same conditions as those in Example 1.

The article fabricated in the cavity according to the present example had good and glossy appearance without any sink marks on its front surface which faced the cavity block during molding. Also, such an article could be fabricated under broad molding conditions of a mold temperature of 65° C. or more, an intra-cavity pressure of 100 kg/cm² or higher, and from low to high injection speed.

The comparative article fabricated in the cavity formed with conventional steel had some defects. That is, the article had sink marks on its entire front surface which faced the cavity block during molding at an intra-cavity pressure of 400 kg/cm³ or less. In the case of an intra-cavity pressure of 500 kg/cm² or less, the article had remarkable sink marks on its front surface corresponding to the rib. Even in the case of an intra-cavity pressure of 600 kg/cm² or more, sink marks were still formed, and gloss of the front surface was inferior to that of the article obtained according to the present invention. Under the condition of a high-speed injection, jetting was caused on a surface of the article near the gate of the mold.

Example 9

A cavity block was obtained in the same way as in Example 1, except that the thickness of the insulating layer provided on the cavity block was 0.3 mm.

Figure 9:
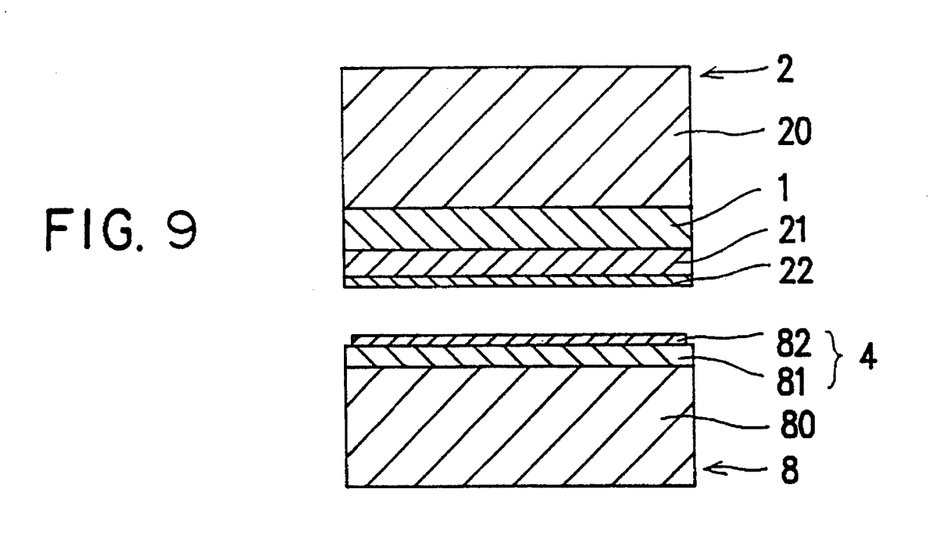
FIG. 9 is a cross-sectional view of a main portion of a mold for injection molding of another example according to the present invention.

An insulating layer having a thickness of 5 mm was formed on the surface of a steel block (5 cm×5 cm×1.5 cm) with a heat-resistant epoxy resin filled with silica powders (thermal conductivity: $3\times10^{-3}$ cal/cm·sec·° C.), and a nickel layer having a thickness of 0.4 mm was formed on the surface of the insulating layer, thereby obtaining a core block 8 as shown in FIG. 9. In FIG. 9, the reference numeral 2 denotes a cavity block, 20 a steel backing, 1 an insulating layer, 21 a nickel plate, 22 a wettability-developing layer, 8 a core block, 80 a steel backing, and 4 a release-functioned insulating layer. The release-functioned insulating layer 4 is formed of an insulating layer 81 and a nickel layer 82.

A polycarbonate resin with 30% glass fiber was molded by injection in the same way as in Example 7, using the mold thus obtained.

In the article of the present example under the condition of a mold temperature of 85° C., an intra-cavity pressure of 150 kg/cm², a high injection speed, and an injection and holding time of 6 seconds, glass fibers did perfectly not appear on the front surface of the article which faced the cavity block during molding. Also, the surface had good gloss, as a result of accurate transfer of the cavity surface. On the other hand, sink marks were recognized on the entire rear surface of the article which faced the core block during molding.

The comparative article had defects. That is, in the case of an intra-cavity pressure of 500 kg/cm² or less, sink marks were formed both on front and rear surfaces. In the case of an intra-cavity pressure of 600 kg/cm² or more, sink marks were not formed; however the front and rear surface did not have gloss due to appearing of glass fibers.

AS described above, according to the present invention, a beautiful article, the front surface of which was accurately transferred and does not have any sink marks, can be obtained at a molding pressure of two-third or less, in some cases, about one-fifth of that in using the conventional mold. Thus, in the case where a thin article with a large size is molded in the mold of the present invention, an injection pressure can be reduced compared with the conventional mold. Consequently, the clamping force can be reduced by at least 30%, resulting in the fabrication of articles with good quality at a low cost without using a high performance molding machine.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A mold for injection molding of a thermoplastic resin comprising a cavity block, a core block, and a cavity formed between the cavity block and the core block and adapted to be filled with a molten resin, wherein:

the cavity block includes an insulating layer on a cavity side thereof, the insulating layer being made of a material selected from the group consisting of ceramic materials, porcelain enamel, glass materials, heat resistant plastic materials and their composites;

the core block includes a release layer on a cavity side thereof, the release layer being made of a material selected from the group consisting of fluorocarbon resins, fluorocarbon resin composite materials, silicone resin composite materials and metal platings with fluorocarbon resin dispersion, the release layer further being adapted to effect both mold releasing and heat insulation; and the molten resin filling the cavity is released more rapidly from the core block than from the cavity block.

2. A mold for injection molding of a thermoplastic resin according to claim 1, wherein the insulating layer has a thermal conductivity less than $8 \times 10^{-3}$ cal/cm·sec·°C. and a thickness of 0.02 to 1 mm.

3. A mold for injection molding of a thermoplastic resin according to claim 1, wherein the insulating layer is made of a material selected from the group consisting of ceramic materials and glass materials and has a thermal conductivity of not more than $8 \times 10^{-3}$ cal/cm·sec·°C. and a thickness of 1 to 20 mm.

4. A mold for injection molding of a thermoplastic resin according to claim 1, wherein the insulating layer is made of a material selected from the group consisting of heat-resistant plastic materials and their composites and has a thickness of 0.3 to 3 mm.

5. A mold for injection molding of a thermoplastic resin according to claim 1, wherein the release layer has a thermal conductivity of not more than $8 \times 10^{-3}$ cal/cm·sec·°C.

6. A mold for injection molding of a thermoplastic resin according to claim 1, wherein an air layer is formed between the cavity side of the core block and the molten resin after the molten resin has filled the cavity and shrunk therein.

7. A mold for injection molding of a thermoplastic resin comprising a cavity block, a core block, and a cavity formed between the cavity block and the core block and adapted to be filled with a molten resin, wherein:

the cavity block includes an insulating layer on a cavity side thereof, the insulating layer being made of a material selected from the group consisting of ceramic materials, porcelain enamel, glass materials, heat resistant plastic materials and their composites, the cavity block further including a thin metal layer formed on a surface of the insulating layer;

the core block includes a release layer on a cavity side thereof, the release layer being made of a material selected from the group consisting of fluorocarbon resins, fluorocarbon resin composite materials, silicone resin composite materials and metal platings with fluorocarbon resin dispersion, the release layer further being adapted to effect both mold releasing and heat insulation; and the molten resin filling the cavity is released more rapidly from the core block than from the cavity block.

8. A mold for injection molding of a thermoplastic resin according to claim 7, wherein the insulating layer is made of a heat resistant plastic material or a composite with a thickness of 0.3 to 3 mm, and the thin metal layer has a thickness of 0.001 to 0.5 mm.

9. A mold for injection molding of a thermoplastic resin according to claim 7, wherein a thin surface coating with wettability to the molten resin is further formed on the metal layer.

10. A mold for injection molding of a thermoplastic resin according to claim 9 wherein the thin surface coating is made of a material selected from the group consisting of a metal oxide, a silicon oxide, a silicon complex oxide, and a plastic material.

11. A mold for injection molding of a thermoplastic resin according to claim 10, wherein the silicon complex oxide is selected from the group consisting of glass materials and porcelain enamel.

12. A mold for injection molding of a thermoplastic resin according to claim 9, wherein the thin surface coating has wettability with a contact angle of not more than 30° against water.

13. A mold for injection molding of a thermoplastic resin comprising a cavity block, a core block, and a cavity formed between the cavity block and the core block and adapted to be filled with a molten resin, wherein:

the cavity block includes an insulating layer on a cavity side thereof, the insulating layer being made of a material selected from the group consisting of ceramic materials, porcelain enamel, glass materials, heat resistant plastic materials and their composites; and the core block includes a release layer on a cavity side thereof, the release layer being made of a material selected from the group consisting of fluorocarbon resins, fluorocarbon resin composite materials, silicone resin composite materials and metal platings with fluorocarbon resin dispersion, the release layer further being adapted to effect both mold releasing and heat insulation.

* * * * *